United States Patent
Avidane et al.

(10) Patent No.: US 12,331,929 B2
(45) Date of Patent: Jun. 17, 2025

(54) OPTICAL DETECTION SYSTEM FOR A GAS TURBINE ENGINE COMBUSTION ASSEMBLY

(71) Applicant: Raytheon Technologies Corporation, Farmington, CT (US)

(72) Inventors: Orin G. Avidane, Lighthouse Point, FL (US); Andre M. Ajami, Henderson, NV (US); Coy Bruce Wood, Ellington, CT (US); Joseph V. Mantese, Ellington, CT (US); David L. Lincoln, Cromwell, CT (US); Stephen K. Kramer, Cromwell, CT (US); Ramesh Rajagopalan, Glastonbury, CT (US)

(73) Assignee: RTX CORPORATION, Farmington, CT (US)

(*) Notice: Subject to any disclaimer, the term of this patent is extended or adjusted under 35 U.S.C. 154(b) by 191 days.

(21) Appl. No.: 18/110,186

(22) Filed: Feb. 15, 2023

(65) Prior Publication Data
US 2024/0271784 A1    Aug. 15, 2024

(51) Int. Cl.
*F23N 5/08* (2006.01)
*F23N 1/00* (2006.01)
*F23R 3/28* (2006.01)

(52) U.S. Cl.
CPC ............ *F23N 5/082* (2013.01); *F23N 1/005* (2013.01); *F23R 3/28* (2013.01); *F23N 2229/04* (2020.01); *F23N 2229/16* (2020.01); *F23N 2229/18* (2020.01)

(58) Field of Classification Search
None
See application file for complete search history.

(56) References Cited

U.S. PATENT DOCUMENTS

| | | | | | |
|---|---|---|---|---|---|
| 3,193,199 | A | * | 7/1965 | Fuhs | F23N 5/082 250/233 |
| 5,148,667 | A | * | 9/1992 | Morey | F02C 9/00 431/13 |
| 5,544,478 | A | * | 8/1996 | Shu | F23N 5/082 60/725 |

(Continued)

FOREIGN PATENT DOCUMENTS

| | | | |
|---|---|---|---|
| RU | 74209 U1 * | 2/2008 | |
| WO | WO-2005045379 A1 * | 5/2005 | ............. F23N 5/082 |

OTHER PUBLICATIONS

EP search report for EP24157898.8 dated Jul. 5, 2024.

*Primary Examiner* — Jason H Duger
(74) *Attorney, Agent, or Firm* — Getz Balich LLC

(57) ABSTRACT

A combustion assembly for a gas turbine engine includes a combustor, a monochromator, and a photodetector assembly. The combustor forms a combustion chamber. The monochromator is disposed outside the combustion chamber. The monochromator is configured to receive an optical input from the combustion chamber and direct an optical output. The optical input has a range of light wavelengths. The optical output has a subset of the range of light wavelengths. The photodetector assembly is disposed outside the combustion chamber. The photodetector assembly is configured to receive the optical output from the monochromator and generate an output signal representative of one or more optical characteristics of the optical output.

19 Claims, 6 Drawing Sheets

(56) References Cited

U.S. PATENT DOCUMENTS

| | | | | |
|---|---|---|---|---|
| 6,490,868 | B1* | 12/2002 | Bunce | F01D 21/003 60/803 |
| 7,136,205 | B1* | 11/2006 | Kaye | G03H 1/0252 430/1 |
| 8,371,102 | B1 | 2/2013 | Lee | |
| 8,456,634 | B2 | 6/2013 | McManus | |
| 10,935,431 | B2 | 3/2021 | Kramer | |
| 2007/0224559 | A1 | 9/2007 | Ni | |
| 2009/0153853 | A1* | 6/2009 | Zelepouga | G01J 5/02 356/300 |
| 2011/0008737 | A1* | 1/2011 | McManus | G01N 21/72 431/12 |
| 2012/0131926 | A1* | 5/2012 | Kopecek | F02C 7/264 60/776 |
| 2021/0262663 | A1* | 8/2021 | Culler | F23N 5/16 |

* cited by examiner

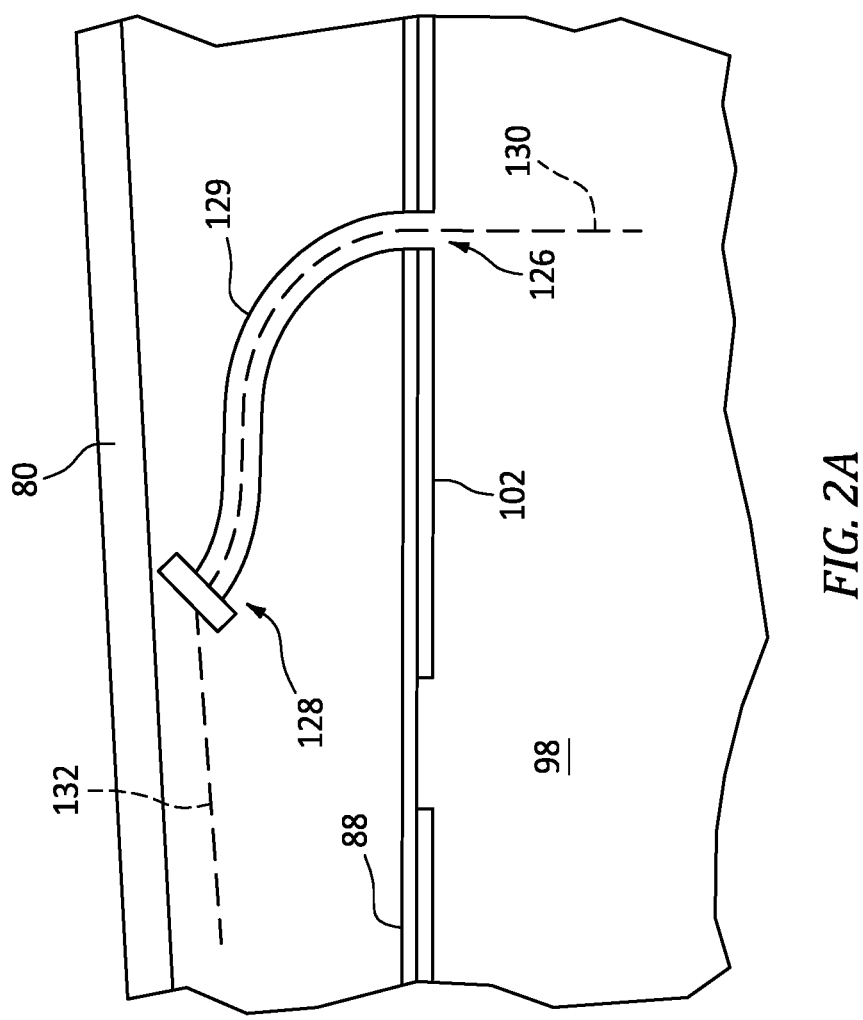

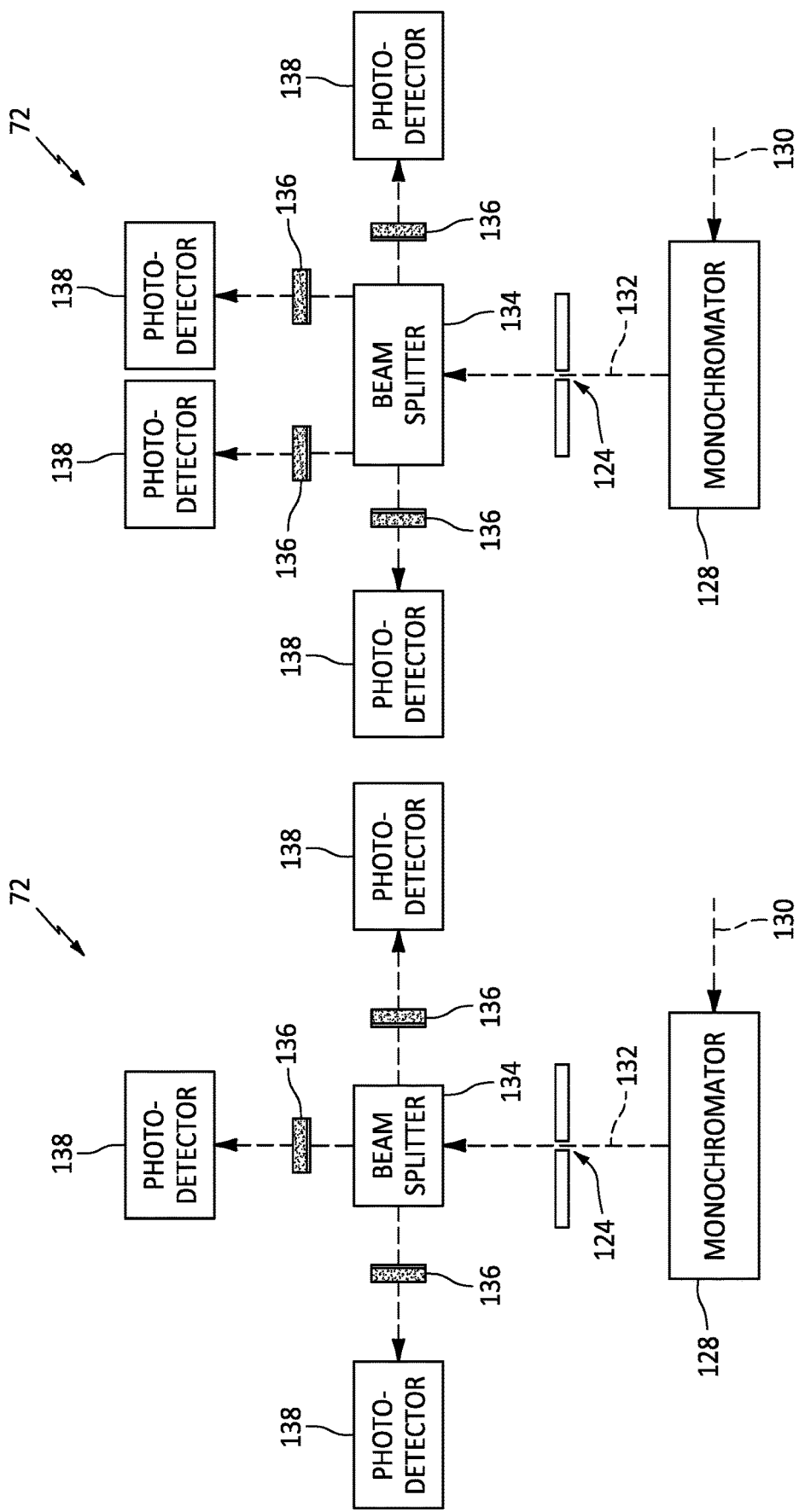

OPTICAL DETECTION SYSTEM FOR A GAS TURBINE ENGINE COMBUSTION ASSEMBLY

BACKGROUND

1. Technical Field

The present disclosure relates to control systems gas turbine engine combustion assemblies and, more particularly, to optical detection systems for monitoring and controlling combustor and combustion chamber operating conditions.

2. Background Information

Gas turbine engines may include systems for monitoring and controlling operating conditions within combustors of the gas turbine engines. Various types and configurations of combustor monitoring and control systems are known in the art. While these known combustor monitoring and control systems have various advantages, there is still room in the art for improvement. There is a need in the art, therefore, for an improved combustor monitoring and control system.

SUMMARY

It should be understood that any or all of the features or embodiments described herein can be used or combined in any combination with each and every other feature or embodiment described herein unless expressly noted otherwise.

According to an aspect of the present disclosure, a combustion assembly for a gas turbine engine includes a combustor, a monochromator, and a photodetector assembly. The combustor forms a combustion chamber. The monochromator is disposed outside the combustion chamber. The monochromator is configured to receive an optical input from the combustion chamber and direct an optical output. The optical input has a range of light wavelengths. The optical output has a subset of the range of light wavelengths. The photodetector assembly is disposed outside the combustion chamber. The photodetector assembly is configured to receive the optical output from the monochromator and generate an output signal representative of one or more optical characteristics of the optical output.

In any of the aspects or embodiments described above and herein, the monochromator may be a volume phase holographic grating (VPHG).

In any of the aspects or embodiments described above and herein, the VPHG may include a first substrate, a second substrate, and a photosensitive core sandwiched between the first substrate and the second substrate. The photosensitive core may include a photosensitive gelatin.

In any of the aspects or embodiments described above and herein, the VPHG may further include an anti-reflective coating disposed on the first substrate.

In any of the aspects or embodiments described above and herein, the combustion assembly may further include a fuel injector configured to direct a fuel into the combustor for combustion within the combustion chamber. The fuel injector may include a housing and a fuel nozzle. The fuel nozzle may be mounted to the housing and disposed within the combustor. The photodetector assembly may be disposed at the housing.

In any of the aspects or embodiments described above and herein, the combustion assembly may further include an outer case extending circumferentially about an axial centerline of the gas turbine engine. The outer case may be disposed radially outward of the combustor. The housing may extend through the outer case.

In any of the aspects or embodiments described above and herein, the monochromator may be disposed at the outer case.

In any of the aspects or embodiments described above and herein, the photodetector assembly may be disposed within the housing.

In any of the aspects or embodiments described above and herein, the housing forms a slit between the photodetector assembly and the monochromator.

In any of the aspects or embodiments described above and herein, the housing may include a first housing portion and a second housing portion. The first housing portion may be disposed radially outside the outer case. The second housing portion may be disposed radially inside the outer case and outside of the combustor. The slit may be formed by the second housing portion.

In any of the aspects or embodiments described above and herein, at least a portion of the photodetector assembly may be disposed within the first housing portion.

In any of the aspects or embodiments described above and herein, the photodetector assembly may include a beam splitter, at least one optical filter, and at least one photodetector. The monochromator may be configured to direct the optical output through the slit to the beam splitter. The beam splitter may be configured to direct the optical output to each photodetector of the at least one photodetector through each respective optical filter of the at least one optical filter.

In any of the aspects or embodiments described above and herein, the at least one optical filter may include a first optical filter and a second optical filter. The first optical filter may have a first wavelength range. The second optical filter may have a second wavelength range. The first wavelength range may be different than the second wavelength range.

In any of the aspects or embodiments described above and herein, the combustion assembly may further include a controller in signal communication with the photodetector assembly and the fuel injector. The controller may include a processor in communication with a non-transitory memory storing instructions, which instructions when executed by the processor, may cause the processor to control the fuel injector to control a flow rate of the fuel directed into the combustion chamber by the fuel injector based on the optical output.

According to another aspect of the present disclosure, a gas turbine engine includes an outer case, a combustor, a fuel injector, a monochromator, and a photodetector assembly. The outer case extends circumferentially about an axial centerline of the gas turbine engine. The combustor is disposed radially inward of the outer case. The combustor forms a combustion chamber. The fuel injector extends through the outer case and the combustor. The fuel injector is configured to direct a fuel into the combustion chamber for combustion within the combustion chamber. The monochromator is mounted to the outer case. The monochromator has a first line-of-sight to the combustion chamber. The photodetector assembly is disposed within the fuel injector. The photodetector assembly has a second line-of-sight to the monochromator.

In any of the aspects or embodiments described above and herein, the fuel injector may include a housing. The housing may form a slit between the photodetector assembly and the monochromator along the second line-of-sight. The photodetector assembly may be disposed within the housing.

In any of the aspects or embodiments described above and herein, at least a portion of the photodetector assembly may be disposed radially outward of the outer case and the slit may be disposed radially inward of the outer case.

In any of the aspects or embodiments described above and herein, the monochromator may be mounted to the outer case axially aft of the fuel injector.

According to another aspect of the present disclosure, a combustion assembly for a gas turbine engine includes a combustor, a volume phase holographic grating (VPHG), and a photodetector assembly. The combustor forms a combustion chamber. The VPHG is disposed outside the combustion chamber. The VPHG configured to receive light from the combustion chamber. The photodetector assembly is disposed outside the combustion chamber. The photodetector assembly has a line-of-sight to the VPHG.

In any of the aspects or embodiments described above and herein, the combustion assembly may further include a plurality of fuel injectors, a plurality of photodetector assemblies, and a plurality of VPHGs. The plurality of fuel injectors is disposed within the combustor. Each fuel injector of the plurality of fuel injectors includes a housing. The plurality of photodetector assemblies includes the photodetector assembly. Each photodetector assembly of the plurality of photodetector assemblies is disposed at the housing of a respective fuel injector of the plurality of fuel injectors. The plurality of VPHGs includes the VPHG. Each VPHG is positioned with a line-of-sight to a respective photodetector assembly of the plurality of photodetector assemblies. Each VPHG is configured to receive light from the combustion chamber as an optical input and direct an optical output to the respective photodetector assembly of the plurality of photodetector assemblies.

The present disclosure, and all its aspects, embodiments and advantages associated therewith will become more readily apparent in view of the detailed description provided below, including the accompanying drawings.

BRIEF DESCRIPTION OF THE DRAWINGS

FIG. 2A diagrammatically illustrates a portion of the combustion assembly of FIG. 2, in accordance with one or more embodiments of the present disclosure.

FIGS. 4A-D diagrammatically illustrate various optical detection systems, in accordance with one or more embodiments of the present disclosure.

DETAILED DESCRIPTION

Figure 1:
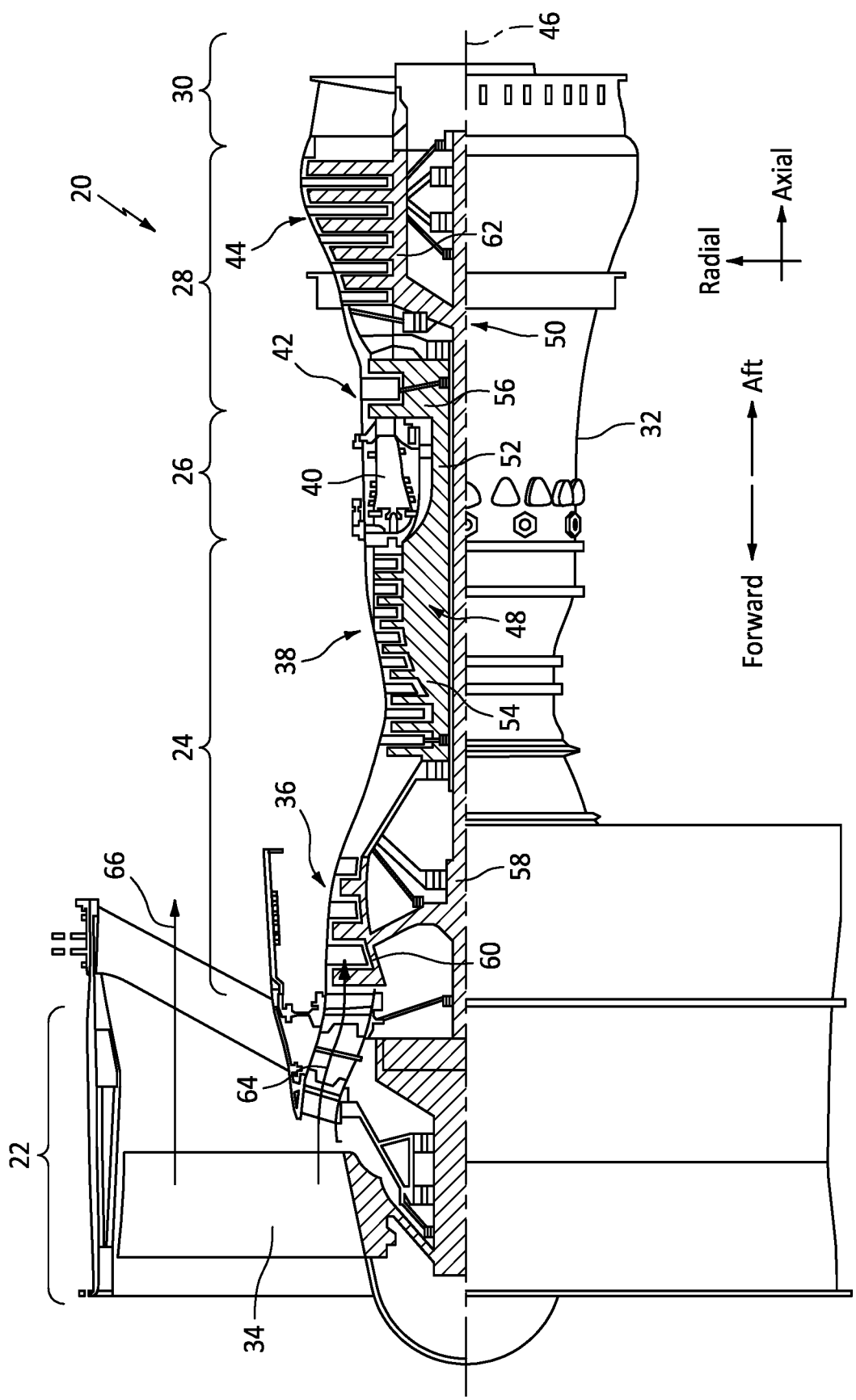
FIG. 1 illustrates a side, cutaway view of a gas turbine engine, in accordance with one or more embodiments of the present disclosure.

FIG. 1 illustrates a side, cutaway view of a gas turbine engine 20 configured for an aircraft propulsion system. The gas turbine engine 20 of FIG. 1 is configured as a multi-spool turbofan gas turbine engine. However, it should be understood that aspects of the present disclosure may be equally applicable to other configurations of gas turbine engines such as, but not limited to, a turboshaft gas turbine engine, a turboprop gas turbine engine, a turbojet gas turbine engine, a propfan gas turbine engine, an open rotor gas turbine engine, an auxiliary power unit (APU), or the like.

The gas turbine engine 20 of FIG. 1 includes a fan section 22, a compressor section 24, a combustor section 26, a turbine section 28, an exhaust section 30, and an engine static structure 32. The fan section 22 includes a fan 34. The compressor section 24 may include a low-pressure compressor (LPC) 36 and a high-pressure compressor (HPC) 38. The combustor section 26 includes a combustor 40 (e.g., an annular combustor). The turbine section 28 may include and a high-pressure turbine (HPT) 42 a low-pressure turbine (LPT) 44.

The gas turbine engine 20 sections 22, 24, 26, 28, and 30 of FIG. 1 are arranged sequentially along an axial centerline 46 (e.g., a rotational axis) of the gas turbine engine 20. The engine static structure 32 may include, for example, one or more engine cases for the gas turbine engine 20. The engine static structure 32 may additionally include cowlings, bearing assemblies, or other structural components of the gas turbine engine 20. The one or more engine cases house and/or structurally support one or more of the engine sections 22, 24, 26, 28, and 30.

The gas turbine engine 20 of FIG. 1 further includes a first rotational assembly 48 (e.g., a high-pressure spool) and a second rotational assembly 50 (e.g., a low-pressure spool). The first rotational assembly 48 and the second rotational assembly 50 of FIG. 1 are mounted for rotation about the axial centerline 46 relative to the engine static structure 32. Alternatively, the first rotational assembly 48 and the second rotational assembly 50 may each be mounted for rotation about different respective rotational axes.

The first rotational assembly 48 includes a first shaft 52, a bladed first compressor rotor 54 for the high-pressure compressor 38, and a bladed first turbine rotor 56 for the high-pressure turbine 42. The first shaft 52 interconnects the bladed first compressor rotor 54 and the bladed first turbine rotor 56. The second rotational assembly 50 includes a second shaft 58, a bladed second compressor rotor 60 for the low-pressure compressor 36, and a bladed second turbine rotor 62 for the low-pressure turbine 44. The second shaft 58 interconnects the bladed second compressor rotor 60 and the bladed second turbine rotor 62. The second shaft 58 may be directly or indirectly connected to the fan 34 to drive rotation of the fan 34. For example, the second shaft 58 may be connected to the fan 34 by one or more speed-reducing gear assemblies (not shown) to drive the fan 34 at a reduced rotational speed relative to the second shaft 58.

During operation of the gas turbine engine 20 of FIG. 1, ambient air enters the gas turbine engine 20 through the fan section 22 and is directed into a core flow path 64 and a bypass flow path 66 by rotation of the fan 34. The core flow path 64 extends generally axially along the axial centerline 46 within the gas turbine engine 20. For example, the core flow path 64 extends axially through the gas turbine engine 20 sections 24, 26, 28, and 30 of FIG. 1. The air within the core flow path 64 may be referred to as "core air." The core air is compressed by the bladed second compressor rotor 60 and the bladed first compressor rotor 54 and directed into a combustion chamber of the combustor 40. Fuel is injected into the combustion chamber and mixed with the compressed core air to form a fuel-air mixture. This fuel-air mixture is ignited and combustion products thereof, which may be referred to as "core combustion gas," flow through and sequentially cause the bladed first turbine rotor 56 and the bladed second turbine rotor 62 to rotate. The rotation of the bladed first turbine rotor 56 and the bladed second turbine rotor 62 respectively drive rotation of the first rotational assembly 48 and the second rotational assembly 50. Rotation of the second rotational assembly 50 further drives rotation of the fan 34, as discussed above.

Figure 2:
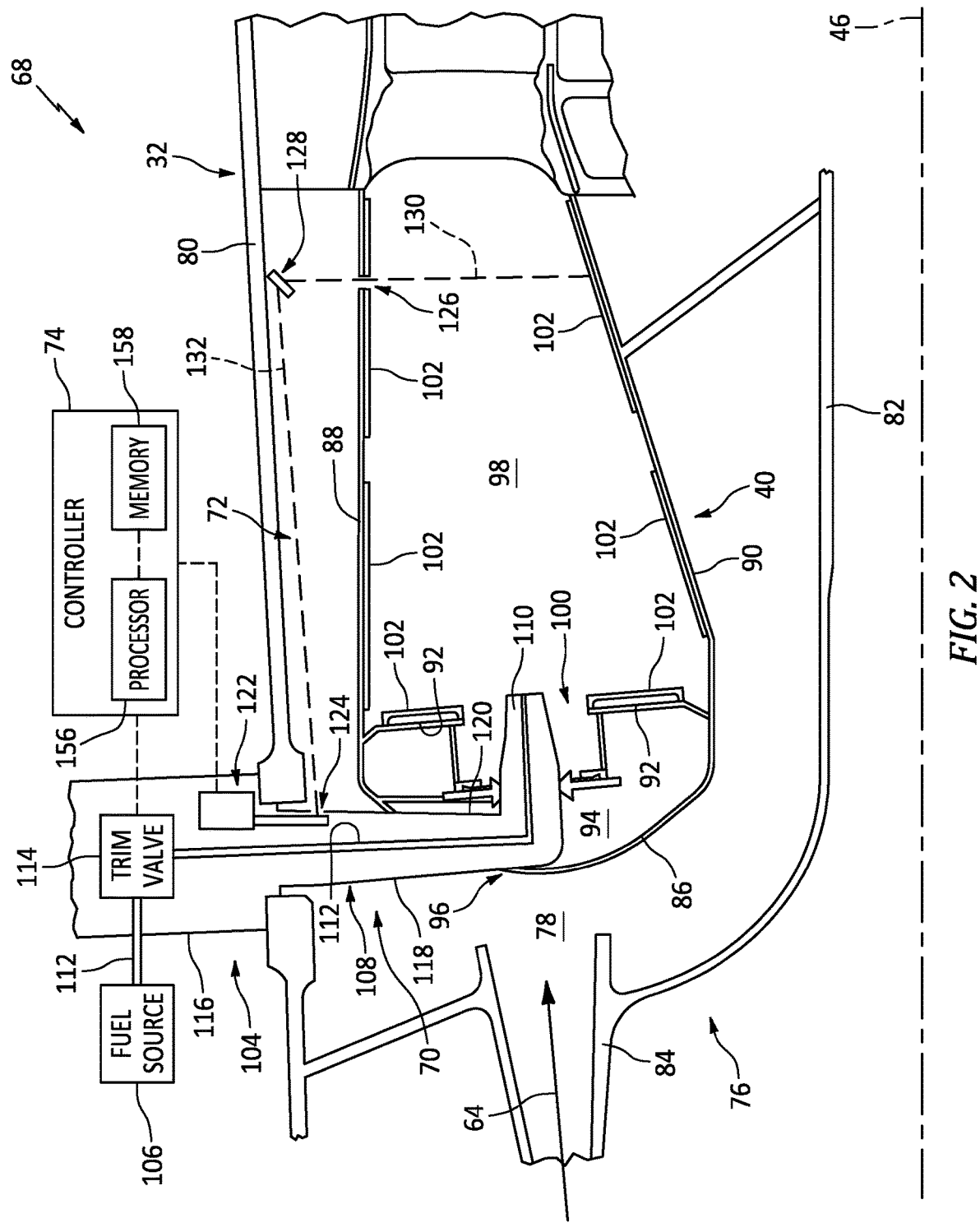
FIG. 2 diagrammatically illustrates a combustion assembly for a gas turbine engine, in accordance with one or more embodiments of the present disclosure.

FIG. 2 schematically illustrates a side, cutaway view of a combustion assembly 68 for the gas turbine engine 20 (see FIG. 1). The combustion assembly 68 of FIG. 2 includes the static structure 32, the combustor 40, a fuel injection system 70, and an optical detection system 72. The combustion assembly 68 may additionally include a controller 74.

The static structure 32 of FIG. 2 includes a diffuser case assembly 76 configured to surround and support the combustor 40. The diffuser case assembly 76 of FIG. 2 forms an annular air plenum 78 between the diffuser case assembly 76 and the combustor 40. The diffuser case assembly 76 of FIG. 2 includes an annular outer diffuser case 80 and an annular inner diffuser case 82. The outer diffuser case 80 is spaced (e.g., radially spaced) outward of the combustor 40. The inner diffuser case 82 is spaced (e.g., radially spaced) inward of the combustor 40. The inner diffuser case 82 is mounted to or otherwise disposed at (e.g., on, adjacent, or proximate) the outer diffuser case 80, for example, at an upstream (e.g., axially forward) end of the inner diffuser case 82. The inner diffuser case 82 forms or otherwise supports an annular diffuser nozzle 84. The annular diffuser nozzle 84 is configured to direct compressed core air into the air plenum 78. At least a portion of the compressed core air directed into the air plenum 78 is further directed into the combustor 40 along the core flow path 64. Additional portions of the compressed core air directed into the air plenum 78 may be further directed into outer (e.g., radially outer) and inner (e.g., radially inner) portions of the air plenum 78 to cool surrounding components.

The combustor 40 of FIG. 2 includes a hood 86, an outer shell 88, an inner shell 90, and a bulkhead 92. The hood 86 forms an annular portion of the combustor 40 at an upstream (e.g., axially forward) end of the combustor 40. The hood 86 forms an annular hood cavity 94 between the hood 86 and the bulkhead 92. The hood 86 further forms one or more fuel injector openings 96 extending through the hood 86 from the air plenum 78 to the hood cavity 94. The fuel injector openings 96 may be circumferentially distributed about the axial centerline 46. The outer shell 88 and the inner shell 90 form annular portions of the combustor 40. For example, the outer shell 88 forms a radially outer portion of the combustor 40 and the inner shell 90 forms a radially inner portion of the combustor 40. The outer shell 88 and the inner shell 90 extend between and to the hood 86 and a downstream (e.g., axially aft) end of the combustor 40 (e.g., where the combustor 40 interfaces with the turbine section 28, see FIG. 1). The outer shell 88 and the inner shell 90 form an annular combustion chamber 98 between (e.g., radially between) the outer shell 88 and the inner shell 90. The bulkhead 92 is configured as an annular bulkhead extending between and to the outer shell 88 and the inner shell 90. The bulkhead 92 separates, in part, the hood cavity 94 from the combustion chamber 98. The bulkhead 92 forms one or more fuel nozzle openings 100. The fuel nozzle openings 100 may be circumferentially distributed about the axial centerline 46. The outer shell 88, the inner shell 90, and/or the bulkhead 92 may include one or more liner panels 102 disposed coincident with the combustion chamber 98. The outer shell 88, the inner shell 90, the bulkhead 92, and/or the liner panels 102 may each include a plurality of cooling holes (e.g., impingement cooling holes or effusion cooling holes) (not shown) configured to direct compressed core air therethrough for cooling of the respective outer shell 88, inner shell 90, bulkhead 92, and/or liner panels 102.

The fuel injection system 70 includes one or more fuel injectors 104 and a fuel source 106. Each fuel injector 104 is configured to direct fuel from the fuel source 106 to the combustion chamber 98 for combustion within the combustion chamber 98. The fuel injectors 104 may be circumferentially distributed about the axial centerline 46. Each fuel injector 104 may include a housing 108, a fuel nozzle 110, a fuel conduit 112, and a trim valve 114.

The housing 108 forms an exterior of the fuel injector 104 and surrounds and/or supports components of the fuel injector 104 such as, but not limited to, the fuel nozzle 110, the fuel conduits 112, and the trim valve 114. The housing 108 of FIG. 2 may be understood to have three housing portions including a first housing portion 116, a second housing portion 118, and a third housing portion 120. The first housing portion 116 is disposed outside (e.g., radially outward) the outer diffuser case 80. The first housing portion 116 may be mounted to or otherwise disposed at (e.g., on, adjacent, or proximate) the outer diffuser case 80 (e.g., an outer radial side of the outer diffuser case 80). The second housing portion 118 extends between and to the first housing portion 116 and the third housing portion 120. The second housing portion 118 is disposed within the air plenum 78. The third housing portion 120 is disposed within the hood cavity 94.

The fuel nozzle 110 is disposed within the combustor 40. For example, the fuel nozzle 110 may extend from the hood cavity 94 toward or into the combustion chamber 98 to direct fuel into the combustion chamber 98. The fuel nozzle 110 is mounted to or otherwise disposed at the third housing portion 120. The fuel nozzle 110 may be configured, for example, as a simplex fuel nozzle or a duplex fuel nozzle, however, the present disclosure is not limited to any particular configuration of the fuel nozzle 110. The fuel conduit 112 is connected in fluid communication with the fuel source 106 and the fuel nozzle 110. The fuel conduit 112 is configured to direct fuel from the fuel source 106 to the fuel nozzle 110. The fuel conduit 112 extends, at least in part, through and within the housing 108.

The trim valve 114 is connected in fluid communication with the fuel conduit 112 (e.g., an intermediate portion of the fuel conduit 112). The trim valve 114 is configured to control a flow rate of the fuel which is directed from the fuel source 106 to the fuel nozzle 110 by the fuel conduit 112. The trim valve 114 may include an actuator configured to position the trim valve 114 in a closed position, an open position, or a plurality of intermediate positions between the closed position and the open position to control the flow rate of the fuel. In some embodiments, the fuel injector 104 may include a plurality of fuel conduits 112 to facilitate multi-fuel nozzle configurations, independent primary fuel and secondary fuel nozzle configurations and the like, and the fuel injector 104 may further include a plurality of respective trim valves 114 to control fuel flow through the respective plurality of fuel conduits 112.

The optical detection system 72 may be configured to measure or otherwise detect optical characteristics (e.g., spectroscopy characteristics) of the combustion chamber 98, which optical characteristics may be representative of, for example, combustion chamber 98 temperature distributions, combustion constituent (e.g., oxygen, nitrogen, water, carbon monoxide, carbon dioxide, etc.) distributions, combustion chamber 98 flame uniformity, combustion chamber 98 acoustic conditions (e.g., prevailing acoustic frequencies), air-fuel mixtures, and the like. The optical detection system 72 of FIG. 2 includes a photodetector assembly 122, a slit 124, a view port 126, and a monochromator 128. The combustion assembly 68 of FIG. 2 includes a single optical detection system 72, however, the present disclosure is not limited to a single optical detection system 72 for the combustion assembly 68. For example, the combustion assembly 68 may include a plurality of optical detection systems 72 with each optical detection system 72 being disposed, at least in part, at (e.g., on, adjacent, or proximate) one of the one or more fuel injectors 104.

The photodetector assembly 122 of FIG. 2 is disposed at (e.g., on, adjacent, or proximate) the fuel injector 104 (e.g., the housing 108) and outside of the combustion chamber 98. For example, the photodetector assembly 122 may be disposed within the housing 108. The photodetector assembly 122 may be disposed within the first housing portion 116 and/or the second housing portion 118. The present disclosure, however, is not limited to disposition of the photodetector assembly 122 at (e.g., on, adjacent, or proximate) the fuel injector 104 and the photodetector assembly 122 may have any position which is suitable for receiving light (e.g., infrared light) from the combustion chamber 98, as will be discussed in further detail. The photodetector assembly 122 disposed within the housing 108 and, more particularly within the first housing portion 116 (e.g., outside the outer diffuser case 80), may facilitate a reduction in the heat from the combustor 40 to which the photodetector assembly 122 is exposed. Moreover, the flow of relatively cool fuel through the fuel conduit 112 within the housing 108 may facilitate a reduction in the heat from the combustor 40 to which the photodetector assembly 122 is exposed.

The slit 124 is formed by the housing 108 at (e.g., on, adjacent, or proximate) the photodetector assembly 122. The slit 124 of FIG. 2 is formed through the housing 108 (e.g., the second housing portion 118) to provide a line-of-sight between the photodetector assembly 122 and the monochromator 128. In other words, the slit 124 may be formed through a portion of the housing 108 such that the slit 124 faces the monochromator 128.

The view port 126 is disposed at (e.g., on, adjacent, or proximate) the outer shell 88. For example, the view port 126 of FIG. 2 is an opening formed through the outer shell 88 and one of the liner panels 102 mounted to the outer shell 88. The view port 126 may be open (e.g., unobstructed) through the outer shell 88 and/or the one of the liner panels 102. The view port 126 may direct air from the air plenum 78 into the combustion chamber 98 to increase an air/fuel ratio within the combustion chamber 98. However, the present disclosure is not limited to the above-described configuration of the view port 126, and the view port 126 may alternatively include a cover (not shown; e.g., a high-temperature resistant, transparent cover). The cover may be configured, for example, as an optical filter to filter (e.g., transmit light within a particular wavelength range) the light from the combustion chamber 98 passing through the cover. The view port 126 is configured to provide a line-of-sight between the combustion chamber 98 and the monochromator 128. The view port 126 of FIG. 2 is disposed at (e.g., on, adjacent, or proximate) a downstream (e.g., axially aft) end of the combustor 40, however, the present disclosure is not limited to any particular location (e.g., axial location) of the view port 126 with respect to the combustor 40.

Alternatively, light from the combustion chamber 98 may be directed to the monochromator 128 by one or more light reflecting and/or light carrying structures such as, but not limited to, a reflector (e.g., a mirror), a fiber optic cable, or the like, with at least one of the light carrying structures having a line-of-sight to the combustion chamber 98. For example, the optical detection system 72 of FIG. 2A includes a fiber optic cable 129 configured to direct light from the combustion chamber 98 to the monochromator 128. The fiber optic cable 129 of FIG. 2A extends from a position at (e.g., on, adjacent, or proximate) the view port 126 to a position at (e.g., on, adjacent, or proximate) the monochromator 128. Use of the one or more light reflecting or light carrying structures may facilitate positioning of the monochromator 128 closer to the photodetector assembly 122 and/or in a lower-temperature portion of the air plenum 78, thereby limiting exposure of the monochromator 128 to relatively high-temperature conditions in proximity to the combustor 40.

The monochromator 128 is disposed outside of the combustion chamber 98. The monochromator 128 of FIG. 2 is disposed between (e.g., radially between) the outer diffuser case 80 and the outer shell 88. For example, the monochromator 128 may be mounted (e.g., directly or indirectly mounted) to the outer diffuser case 80 (e.g., an inner radial side of the outer diffuser case 80). The monochromator 128 may alternatively be mounted to another structural component of the combustion assembly 68 outside of the combustion chamber 98. The monochromator 128 of FIG. 2 is axially displaced from the photodetector assembly 122 and the fuel injector 104. For example, the monochromator 128 of FIG. 2 is disposed axially aft of the photodetector assembly 122 and the fuel injector 104. The monochromator 128 may be positioned at (e.g., on, adjacent, or proximate) an axial location corresponding to a downstream portion (e.g., an axially downstream half) of the combustor 40. The monochromator 128 may be positioned at (e.g., on, adjacent, or proximate) an axial location corresponding to a downstream end of the combustor 40. The present disclosure, however, is not limited to any particular axial position of the monochromator 128 with respect to the combustor 40.

The monochromator 128 is configured to receive an optical input 130 (e.g., light) from the combustion chamber 98 (e.g., through the view port 126) and direct an optical output 132 (e.g., light) to the photodetector assembly 122 (e.g., through the slit 124). In other words, the monochromator 128 is positioned between the view port 126 and the slit 124 to receive the optical input 130 from the combustion chamber 98 and direct the optical output 132 to the photodetector assembly 122. The monochromator 128 may be configured for optical dispersion (e.g., the monochromator 128 may be configured as a prism) or optical diffraction (e.g., the monochromator 128 may be configured as a diffraction grating). The present disclosure is not limited to any particular configuration of the monochromator 128. Due to the presence of the monochromator 128 in proximity to the combustor 40, the monochromator 128 may be formed by or otherwise include materials which are resistant to relatively high temperatures, such as those exceeding 1,000° F. (538° C.). The monochromator 128 may receive at least some cooling air flow, for example, from the compressed core air directed into the air plenum 78.

The optical input 130 received by the monochromator 128 may have a range of light wavelengths (e.g., colors). In general, the monochromator 128 spatially separates the range of light wavelengths of the optical input 130 into individual light wavelengths (e.g., monochromatic light). The monochromator 128 may facilitate selection of light wavelengths of the optical input 130 to direct a narrower range of selected light wavelengths in the optical output 132. In other words, the optical output 132 received by the photodetector assembly 122 (e.g., the portion of the optical output 132 which is directed through the slit 124) may include only a subset of the range of light wavelengths of the optical input 130. Unwanted light wavelengths of the optical input 130 may still be directed by the monochromator 128 in a direction in which these unwanted light wavelengths will not pass through the slit 124 to the photodetector assembly 122. Accordingly, these unwanted light wavelengths may not form a portion of the optical output 132. In this regard, the monochromator 128 may filter the optical input 130 from the combustion chamber 98 so that only light wavelengths of interest are directed to the photodetector assembly 122.

Figure 3:
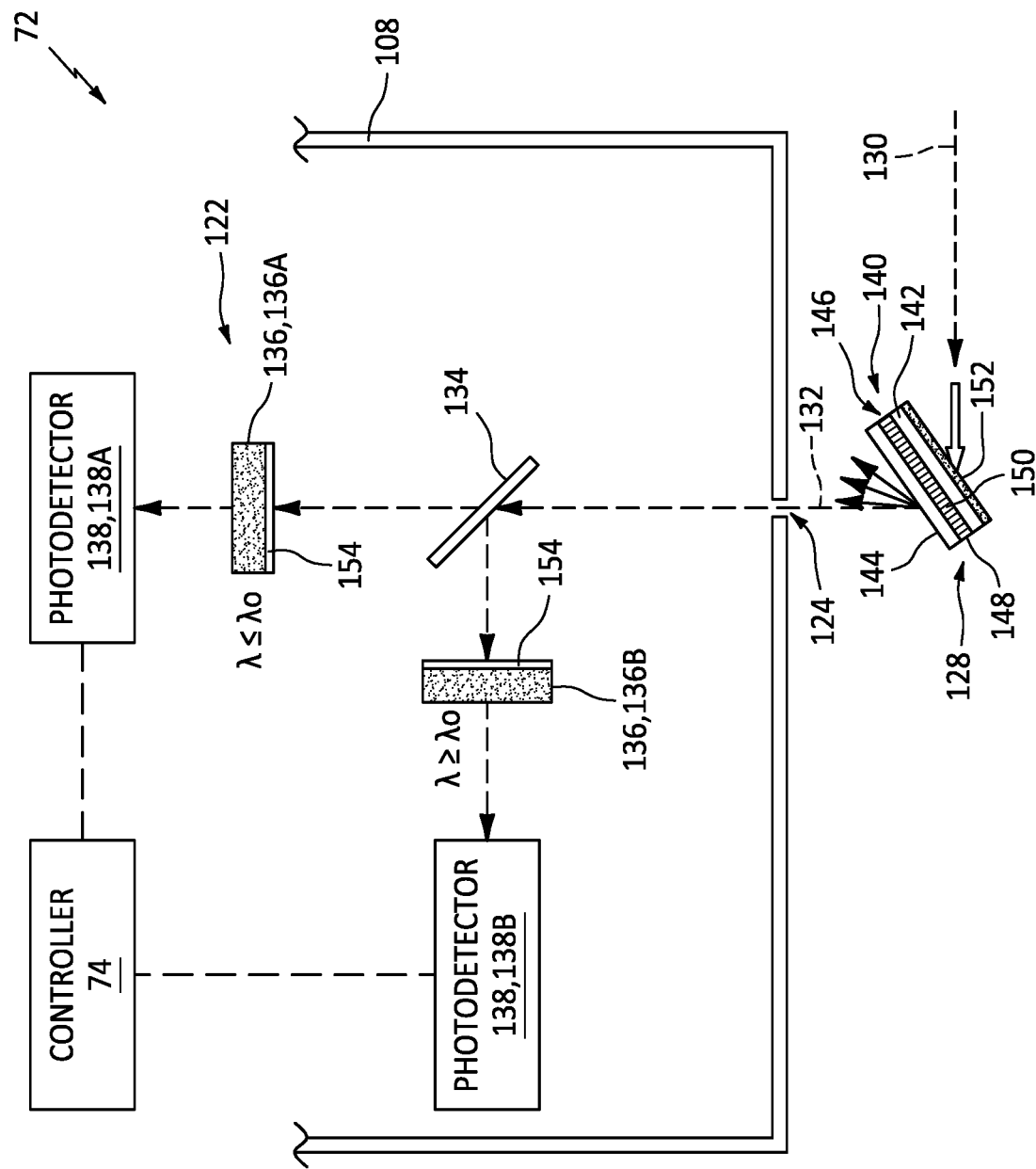
FIG. 3 diagrammatically illustrates an optical detection system for the combustion assembly of FIG. 2, in accordance with one or more embodiments of the present disclosure.

FIG. 3 diagrammatically illustrates an embodiment of the optical detection system 72 showing the monochromator 128, the slit 124, and the photodetector assembly 122. The monochromator 128 of FIG. 3 receives the optical input 130 (e.g., from the combustion chamber 98) and directs the optical output 132 through the slit 124 to the photodetector assembly 122. The photodetector assembly 122 includes a beam splitter 134, one or more optical filters 136, and one or more photodetectors 138. For example, the photodetector assembly 122 of FIG. 3 includes a first optical filter 136A, a second optical filter 136B, a first photodetector 138A, and a second photodetector 138B. The one or more photodetectors 138 may be disposed within the first housing portion 116 while the beam splitter 134 and/or the one or more optical filters 136 may be disposed within the second housing portion 118 at (e.g., on, adjacent, or proximate) the slit 124 (see FIG. 2). The present disclosure, however, is not limited to the particular configuration, orientation, or number of components of the optical detection system 72 of FIG. 3.

The monochromator 128 of FIG. 3 is configured as a volume phase holographic grating (VPHG) 140. The VPHG 140 of FIG. 3 includes a first substrate 142, a second substrate 144, and a photosensitive core 146 sandwiched between the first substrate 142 and the second substrate 144. The first substrate 142 is positioned with a line-of-sight to the combustion chamber 98 to receive the optical input 130. The second substrate 144 is positioned with a line-of-sight to the slit 124 to direct the optical output 132 to the photodetector assembly 122. The first substrate 142 and the second substrate 144 may include or otherwise be formed by a suitable transparent and high-temperature resistant material such as, but not limited to, fused silica or another suitable glass material. The photosensitive core 146 includes a core body 148 and a photosensitive gelatin 150. The core body 148 extends between and connects the first substrate 142 and the second substrate 144. The core body 148 may be mounted to or otherwise attached to the first substrate 142 and the second substrate 144. The core body 148 surrounds the photosensitive gelatin 150 between the first substrate 142 and the second substrate 144 so that the photosensitive gelatin 150 is sealed within the first substrate, the second substrate, and the core body 148. The core body 148 may include or otherwise be formed by a material similar to that of the first substrate 142 and the second substrate 144 such as, but not limited to, fused silica or another suitable glass material which is resistant to the high-temperature conditions expected in proximity to the combustor 40. The photosensitive gelatin 150 is formed by or otherwise includes a dichromated gelatin (DCG) film disposed between the first substrate 142 and the second substrate 144. The density of the DCG film varies spatially within the VPHG 140 to form a spatially-modulated refractive index of the photosensitive gelatin 150 which facilitates separation of the range of light wavelengths of the optical input 130 into individual light wavelengths (e.g., monochromatic light), as previously discussed. The VPHG 140 may, therefore, form a transmission grating through which the optical input 130 passes and is thereby diffracted. The VPHG 140 may facilitate improved filtering of the optical input 130 while also providing improved diffraction efficiency across broad light wavelength ranges, relatively low scatter of stray light, minimal ghosting, and low polarization, relative to at least some conventional optical detection systems.

The VPHG 140 may include an anti-reflective coating 152. The anti-reflective coating 152 of FIG. 3 is disposed on the first substrate 142. For example, the anti-reflective coating 152 of FIG. 3 is disposed on an exterior surface of the first substrate 142 such that the optical input 130 passes through the anti-reflective coating 152 before the first substrate 142. The present disclosure, however, is not limited to this particular configuration of the anti-reflective coating 152 and the anti-reflective coating may be disposed on the first substrate 142 and/or the second substrate 144, or neither of the first substrate 142 or the second substrate 144. The anti-reflective coating 152 may facilitate a reduction in transmission losses of the VPHG 140 by reducing an amount of the optical input 130 which may be reflected by the first substrate 142. The anti-reflective coating 152 may include or otherwise be formed by any suitable anti-reflective coating material conventionally known in the art.

The beam splitter 134 is configured to split the optical output 132 of the monochromator 128 (e.g., the VPHG 140) for direction to the one or more optical filters 136 and the one or more photodetectors 138. The beam splitter 134 is positioned to receive the optical output 132 of the monochromator 128 after the optical output 132 passes through the slit 124. The beam splitter 134 may be configured with one or more mirrors (e.g., half-silvered mirrors), one or more prisms (e.g., a dichroic prism, a trichroic prism, a quadchroic prism, etc.), or any other suitable beam splitter configuration for directing the optical output 132 to each of the optical filters 136 and photodetectors 138 of the photodetector assembly 122.

The one or more optical filters 136 are configured to filter the optical output 132 prior to receipt of the optical output by the one or more photodetectors 138. As shown in FIG. 3, for example, the first optical filter 136A is positioned to filter the optical output 132 between the beam splitter 134 and the first photodetector 138A and the second optical filter 136B is positioned to filter the optical output 132 between the beam splitter 134 and the second photodetector 138B. Each of the optical filters 136 may transmit light of a particular wavelength range while absorbing or otherwise blocking light outside of that particular wavelength range. Each of the optical filters 136 may be different than one or more other optical filters 136. For example, the first optical filter 136A of FIG. 3 is configured as a high-pass optical filter and the second optical filter 136B of FIG. 3 is configured as a low-pass optical filter. Accordingly, the first optical filter 136A may transmit light of a first wavelength range while the second optical filter 136B may transmit light of a different second wavelength range. The first wavelength range may correspond to light having a shorter wavelength (e.g., a higher frequency) than light for the second wavelength range. For example, the first optical filter 136A may transmit light having a wavelength which is less than or equal to a target wavelength $\lambda_0$ while the second optical filter 136B may transmit light having a wavelength which is greater than or equal to the target wavelength $\lambda_0$. Of course, the respective wavelength ranges of the optical filters 136 may alternatively overlap (a "band overlap") or be non-contiguous (e.g., there may be a range of wavelengths (a "band gap") between the first wavelength range and the second wavelength range). The present disclosure is not limited to any particular range size for the band overlap and/or the band gap. Routine experimentation may be performed by those of ordinary skill in the art to determine a suitable wavelength range for each optical filter 136 and its associated photodetector 138 in accordance with an as informed by one or more aspects of the present disclosure.

The optical filters 136 may include an anti-reflective coating 154. The anti-reflective coating 154 of FIG. 3 is disposed on the optical filters 136. For example, the anti-reflective coating 154 of FIG. 3 is disposed on a surface of each of the optical filters 136, which surface faces the beam splitter 134. The anti-reflective coating 154 may facilitate a reduction in transmission losses of the optical filters 136 by reducing an amount of the optical output 132 which may be reflected by the optical filters 136. Like the anti-reflective coating 152, the anti-reflective coating 154 may include or otherwise be formed by any suitable anti-reflective coating material conventionally known in the art.

The photodetectors 138 are configured to receive the optical output 132 (e.g., from the respective optical filters 136) and generate an electrical or electronic output signal which is representative of one or more optical characteristics of the received optical output 132. For example, the photodetectors 138 may detect ultra-violet ("UV") light (e.g., wavelengths of approximately 10-400 nm) or deep UV light (e.g., wavelengths of approximately 200-280 nm), visible light (e.g., wavelengths of approximately 400-700 nm), and/or infrared light (e.g., wavelengths of approximately 700-1,000 nm) corresponding to one or more wavelengths emitted by high-temperature combustion constituents within the combustion chamber 98 such as, but not limited to, oxygen, nitrogen, water, carbon monoxide, carbon dioxide, and the like. The photodetectors 138 may additionally or alternatively detect optical characteristics (e.g., a wavelength spectrum) of the optical output 132 which are representative combustion chamber 98 parameters such as, but not limited to, temperatures within the combustion chamber 98, acoustic conditions (e.g., prevailing acoustic frequencies) within the combustion chamber 98, air-fuel mixtures within the combustion chamber 98, and the like. Each photodetector 138 may include or otherwise be configured as a phototransistor, a photodiode, or other electrical or electronic circuit or optical imaging device (e.g., camera) configured to generate an output signal which is representative of one or more optical characteristics of the received optical output 132. The photodetectors 138 may be configured as multi-spectral photodetectors.

FIGS. 4A-D diagrammatically illustrate various exemplary embodiments of the optical detection system 72. Each of the optical detection system 72 embodiments of FIGS. 4A-D include the monochromator 128, the slit 124, the beam splitter 134, the one or more optical filters 136, and the one or more photodetectors 138. The optical detection system 72 embodiments of FIGS. 4A-D include various numbers and arrangements of optical detection system 72 components such as, but not limited to, the one or more optical filters 136 and/or the one or more photodetectors 138. It should be understood, however, that the present disclosure is not limited to any particular number or arrangement of optical detection system 72 components or combinations or configurations thereof.

Figure 4B:
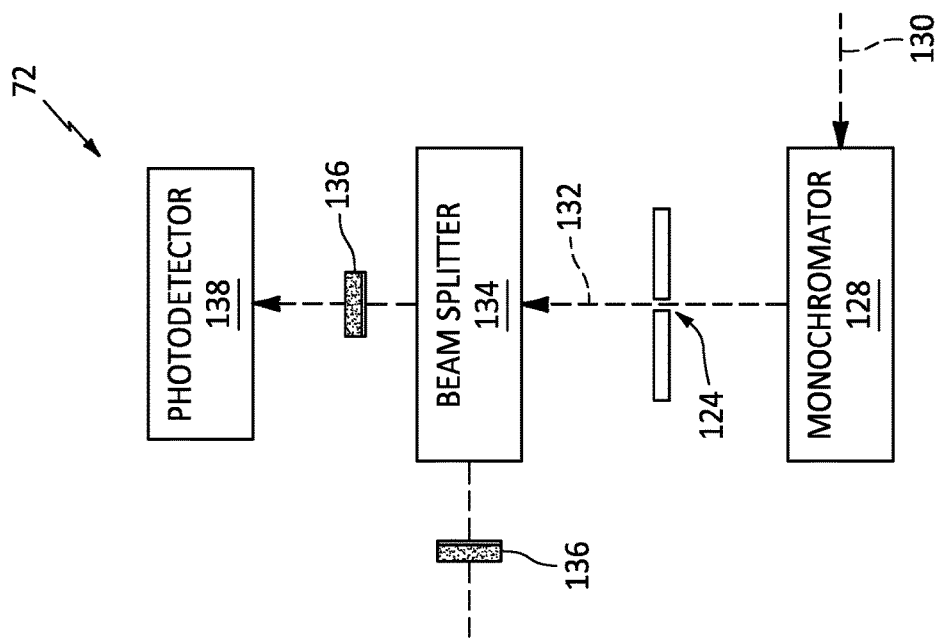
Figure 4A:
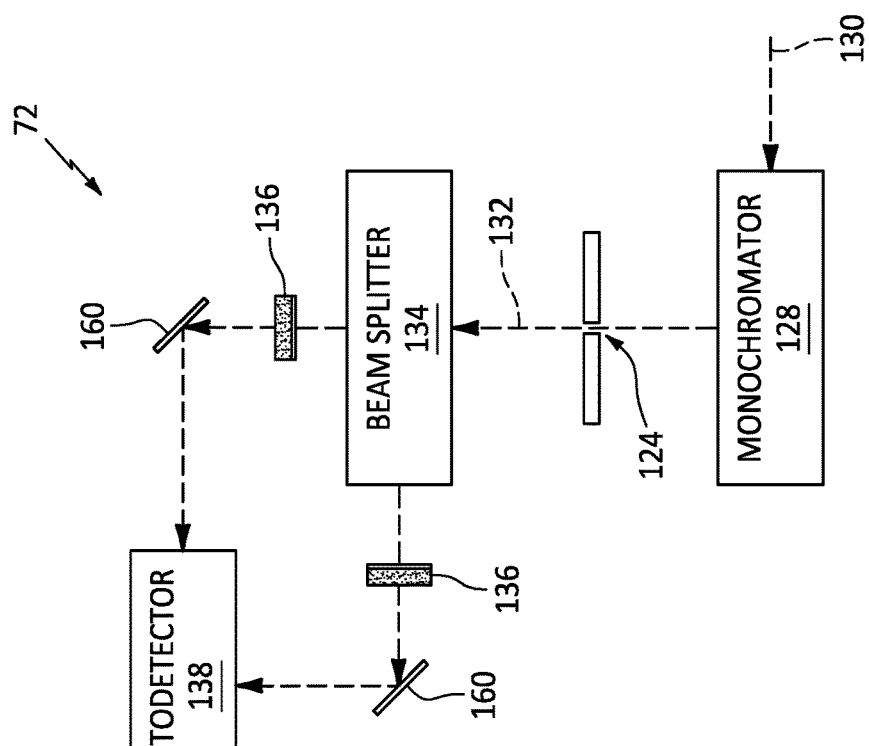

FIG. 4A includes a single photodetector 138 and two optical filters 136. The beam splitter 134 of FIG. 4A directs the optical output 132 from the monochromator 128 to each optical filter 136. Each optical filter 136 of FIG. 4A may have a different wavelength transmission range than each other optical filter 136 of FIG. 4A. The optical detection system 72 of FIG. 4A further includes mirrors 160 configured to direct the optical output 132 from the two optical filters 136 to the photodetector 138. The photodetector 138 is configured to receive the optical output 132 from each of the optical filters 136 and generate an output signal representative of the optical output 132 from each of the optical filters 136.

FIG. 4B includes two photodetectors 138 and two optical filters 136. The beam splitter 134 of FIG. 4B directs the optical output 132 from the monochromator 128 to each optical filter 136. Each optical filter 136 of FIG. 4B may have a different wavelength transmission range than each other optical filter 136 of FIG. 4B. Each photodetector 138 of FIG. 4B is configured to receive the optical output 132 from a respective one of the optical filters 136 and generate an output signal representative of the optical output 132 from the respective one of the optical filters 136.

FIG. 4C includes three photodetectors 138 and three optical filters 136. The beam splitter 134 of FIG. 4C directs the optical output 132 from the monochromator 128 to each optical filter 136. Each optical filter 136 of FIG. 4C may have a different wavelength transmission range than each other optical filter 136 of FIG. 4C. Each photodetector 138 of FIG. 4C is configured to receive the optical output 132 from a respective one of the optical filters 136 and generate an output signal representative of the optical output 132 from the respective one of the optical filters 136.

FIG. 4D includes four photodetectors 138 and four optical filters 136. The beam splitter 134 of FIG. 4D directs the optical output 132 from the monochromator 128 to each optical filter 136. Each optical filter 136 of FIG. 4D may have a different wavelength transmission range than each other optical filter 136 of FIG. 4D. Each photodetector 138 of FIG. 4D is configured to receive the optical output 132 from a respective one of the optical filters 136 and generate an output signal representative of the optical output 132 from the respective one of the optical filters 136.

Referring again to FIG. 2, the controller 74 is connected in signal communication with the photodetector assembly 122 (e.g., each photodetector 138) and the fuel injector 104 (e.g., the trim valve 114). The controller 74 includes a processor 156 and memory 158. The memory 158 is connected in signal communication with the processor 156. The processor 156 may include any type of computing device, computational circuit, or any type of process or processing circuit capable of executing a series of instructions that are stored in the memory 158, thereby causing the processor 156 to perform or control one or more steps or other processes. The processor 156 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 158 may represent one or more algorithms for controlling aspects of the combustion assembly 68 including the fuel injection system 70 and/or the optical detection system 72, and the stored instructions are not limited to any particular form (e.g., program files, system data, buffers, drivers, utilities, system programs, etc.) provided they can be executed by the processor 156. The memory 158 may be a non-transitory computer readable storage medium configured to store instructions that when executed by one or more processors, cause the one or more processors to perform or cause the performance of certain functions. The memory 158 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 74 may be achieved via the use of hardware, software, firmware, or any combination thereof. The controller 74 may also include input and output devices (e.g., keyboards, buttons, switches, touch screens, video monitors, sensor readouts, data ports, etc.) that enable the operator to input instructions, receive data, etc.

The controller 74 may form or otherwise be part of an electronic engine controller (EEC) for the gas turbine engine 20. The EEC may control operating parameters of the gas turbine engine 20 including, but not limited to, fuel flow to the combustion chamber 98, stator vane position (e.g., variable compressor inlet guide vane (IGV) position), compressor air bleed valve position, etc. so as to control an engine power and/or thrust of the gas turbine engine 20. In some embodiments, the EEC may be part of a full authority digital engine control (FADEC) system for the gas turbine engine 20.

The controller 74 may control fuel flow supplied by each fuel injector 104 to the combustion chamber 98 using the optical output signal(s) from the optical detection system 72. For example, the memory 158 may include instructions which, when executed by the processor 156, cause the processor to control each fuel injector 104 (e.g., the trim valve 114) to control a flow rate (e.g., increase, decrease, or maintain a flow rate) of the fuel directed into the combustion chamber 98 by the fuel injector 104 based on the optical output signal(s) from the optical detection system 72. The controller 74 may control the fuel injectors 104 individually to separately control the fuel flow directed to different portions (e.g., circumferential portions) of the combustion chamber 98. Using the optical output signal(s) from the optical detection system 72, the controller 74 may identify a temperature (e.g., an absolute or a relative temperature) within the combustion chamber 98 or a portion of the combustion chamber 98, an amount of a combustion constituent within the combustion chamber 98, a ratio of air to fuel within the combustion chamber 98, acoustic conditions within the combustion chamber 98, combustor health conditions of the combustor 40 (e.g., monitoring of combustor 40 component 88, 90, 92, 102 and/or component thermal barrier coating (TBC) condition and/or degradation), or the like based on optical characteristics of the optical output 132 represented by the optical output signals(s). Routine experimentation may be performed by persons of ordinary skill in the art to determine suitable fuel injector 104 (e.g., trim valve 114) control criteria for different optically identified combustion chamber 98 conditions in accordance with and as informed by one or more aspects of the present disclosure.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A combustion assembly for a gas turbine engine, the combustion assembly comprising:

a combustor forming a combustion chamber;
a monochromator disposed outside the combustion chamber, the monochromator configured to receive an optical input from the combustion chamber and direct an optical output, the optical input having a range of light wavelengths, the optical output having a subset of the range of light wavelengths;
a fuel injector configured to direct a fuel into the combustor for combustion within the combustion chamber, the fuel injector including a housing and a fuel nozzle, the fuel nozzle mounted to the housing and disposed within the combustor; and
a photodetector assembly disposed at the housing outside the combustion chamber, the photodetector assembly configured to receive the optical output from the monochromator and generate an output signal representative of one or more optical characteristics of the optical output.

2. The combustion assembly of claim 1, wherein the monochromator is a volume phase holographic grating (VPHG).

3. The combustion assembly of claim 2, wherein the VPHG includes a first substrate, a second substrate, and a photosensitive core sandwiched between the first substrate and the second substrate, the photosensitive core including a photosensitive gelatin.

4. The combustion assembly of claim 3, wherein the VPHG further includes an anti-reflective coating disposed on the first substrate.

5. The combustion assembly of claim 1, further comprising an outer case extending circumferentially about an axial centerline of the gas turbine engine, the outer case disposed radially outward of the combustor;
wherein the housing extends through the outer case.

6. The combustion assembly of claim 5, wherein the monochromator is disposed at the outer case.

7. The combustion assembly of claim 1, wherein the photodetector assembly is disposed within the housing.

8. The combustion assembly of claim 7, wherein the housing forms a slit between the photodetector assembly and the monochromator.

9. The combustion assembly of claim 8, wherein the housing includes a first housing portion and a second housing portion, the first housing portion disposed radially outside an outer case, the second housing portion disposed radially inside the outer case and outside of the combustor, the slit formed by the second housing portion.

10. The combustion assembly of claim 9, wherein at least a portion of the photodetector assembly is disposed within the first housing portion.

11. The combustion assembly of claim 8, wherein the photodetector assembly includes a beam splitter, at least one optical filter, and at least one photodetector, the monochromator configured to direct the optical output through the slit to the beam splitter, the beam splitter configured to direct the optical output to each photodetector of the at least one photodetector through each respective optical filter of the at least one optical filter.

12. The combustion assembly of claim 11, wherein the at least one optical filter includes a first optical filter and a second optical filter, the first optical filter has a first wavelength range, the second optical filter has a second wavelength range, and the first wavelength range is different than the second wavelength range.

13. The combustion assembly of claim 1, further comprising a controller in signal communication with the photodetector assembly and the fuel injector, the controller including a processor in communication with a non-transitory memory storing instructions, which instructions when executed by the processor, cause the processor to:
control the fuel injector to control a flow rate of the fuel directed into the combustion chamber by the fuel injector based on the optical output.

14. A gas turbine engine comprising:
an outer case extending circumferentially about an axial centerline of the gas turbine engine;
a combustor disposed radially inward of the outer case, the combustor forming a combustion chamber;
a fuel injector extending through the outer case and the combustor, the fuel injector configured to direct a fuel into the combustion chamber for combustion within the combustion chamber;
a monochromator mounted to the outer case, the monochromator having a first line-of-sight to the combustion chamber; and
a photodetector assembly disposed within the fuel injector, the photodetector assembly having a second line-of-sight to the monochromator.

15. The gas turbine engine of claim 14, wherein the fuel injector includes a housing, the housing forming a slit between the photodetector assembly and the monochromator along the second line-of-sight, the photodetector assembly disposed within the housing.

16. The gas turbine engine of claim 15, wherein at least a portion of the photodetector assembly is disposed radially outward of the outer case and the slit is disposed radially inward of the outer case.

17. The gas turbine engine of claim 14, wherein the monochromator is mounted to the outer case axially aft of the fuel injector.

18. A combustion assembly for a gas turbine engine, the combustion assembly comprising:
a combustor forming a combustion chamber;
a plurality of fuel injectors disposed within the combustor, each fuel injector of the plurality of fuel injectors including a housing;
a volume phase holographic grating (VPHG) disposed outside the combustion chamber, the VPHG configured to receive light from the combustion chamber; and
a plurality of photodetector assemblies, each photodetector assembly of the plurality of photodetector assemblies at the housing of a respective fuel injector of the plurality of fuel injectors, at least one of the plurality of photodetector assemblies having a line-of-sight to the VPHG.

19. The combustion assembly of claim 18, further comprising a plurality of VPHGs, the plurality of VPHGs including the VPHG, each VPHG positioned with a line-of-sight to a respective photodetector assembly of the plurality of photodetector assemblies, each VPHG configured to receive light from the combustion chamber as an optical input and direct an optical output to the respective photodetector assembly of the plurality of photodetector assemblies.

* * * * *